United States Patent [19]
Stoll

[11] Patent Number: 5,221,113
[45] Date of Patent: Jun. 22, 1993

[54] MALE AND FEMALE SCREW THREADS, MORE ESPECIALLY FOR PNEUMATIC EQUIPMENT

[75] Inventor: Kurt Stoll, Esslingen, Fed. Rep. of Germany

[73] Assignee: Festo K.G., Esslingen, Fed. Rep. of Germany

[21] Appl. No.: 728,172

[22] Filed: Jul. 10, 1991

[30] Foreign Application Priority Data

Apr. 9, 1991 [DE] Fed. Rep. of Germany ........ 4111463

[51] Int. Cl.⁵ .............................................. F16L 25/00
[52] U.S. Cl. ..................................... 285/333; 285/355
[58] Field of Search ......................... 285/355, 390, 333

[56] References Cited

U.S. PATENT DOCUMENTS

| | | | |
|---|---|---|---|
| 597,000 | 1/1898 | Higbee | 285/390 X |
| 3,323,402 | 6/1967 | Gowen et al. | |
| 3,376,053 | 4/1968 | Novakovich et al. | |
| 4,033,615 | 7/1977 | Miller, Jr. et al. | |
| 4,266,813 | 5/1981 | Oliver | |
| 4,588,213 | 5/1986 | Bollfrass et al. | 285/355 X |
| 4,712,812 | 12/1987 | Weir, III | |
| 4,796,928 | 1/1989 | Carlin et al. | |

FOREIGN PATENT DOCUMENTS

| | | | |
|---|---|---|---|
| 539214 | 4/1957 | Canada | 285/390 |
| 0091844 | 10/1983 | European Pat. Off. | |
| 0370641 | 5/1990 | European Pat. Off. | |
| 1027014 | 3/1958 | Fed. Rep. of Germany | |
| 2906317 | 8/1979 | Fed. Rep. of Germany | 285/390 |
| 1124979 | 10/1956 | France | |
| 1191066 | 10/1959 | France | |
| 365375 | 1/1932 | United Kingdom | 285/355 |

*Primary Examiner*—Dave W. Arola
*Attorney, Agent, or Firm*—Hoffmann & Baron

[57] ABSTRACT

The invention provides a male thread as a universal thread which may be screwingly connected with different types of female thread. It includes a taper thread section at the front or free end which is followed by a cylindrical thread section. The latter is constituted by a cylindrical BSP thread or a Withworth pipe thread corresponding to the respective thread nominal size, the number of threads per inch being selected to be equal to the nominal value conventional for the nominal size of thread. The number of threads per inch in the taper section is in a range between the nominal values of the cylindrical thread section and of an NPT thread with the same size. Furthermore the invention proposes a female thread with the same design, which may also be used as a universal thread.

32 Claims, 2 Drawing Sheets

MALE AND FEMALE SCREW THREADS, MORE ESPECIALLY FOR PNEUMATIC EQUIPMENT

BACKGROUND OF THE INVENTION

The invention relates on the one hand to a male screw thread for a threaded member to be screwed into a female screw thread in a cooperating member more particularly in the form of a cylindrical or taper Withworth pipe thread, a BSP thread, Japanese pipe thread (PT) or National pipe thread (NPT) such as for the production of connections in pneumatic systems. On the other hand the invention relates to a female screw thread serving the same purpose and suitable for receiving a male screw thread on a male member which more particularly has a cylindrical or taper section in the form of a Withworth pipe thread, a BSP thread, a Japanese pipe thread (PT) or a National pipe thread (NPT), the female screw thread having a taper section at the front axial end which is to be screwed in and tapering in the direction of insertion from a cylindrical screw section of the male thread.

In the field of pneumatic and hydraulic systems it is necessary to use many different types of screw connections for the production of systems containing the working fluid. This may for instance be to produce connections with fluid power pipes, fluid power hose, tubes or the like components with pneumatic or, respectively, hydraulic means such as piston and cylinder units or valves or only to shut off a port in such a device by means of a plug.

So far there has been the disadvantage that different countries prescribe different types of screw threads or different standards so that the individual component and pieces of equipment have to be fitted with types of screw thread dependent on the location of use. The most frequent types of screw thread are the National pipe thread (NPT, USA), the Japanese pipe thread (PT), and the British standard pipe thread (BSP) with a taper and cylindrical form and which practically corresponds to the taper (DIN 2999) or cylindrical (ISO 228/1) Withworth pipe thread, which is the pipe thread overwhelmingly employed in Germany. It is clear that the production of components with such a wide variety of types of screw thread is very expensive. Furthermore confusion is likely as for instance by mistakes of the supplier which are only noticed later during use or if not noticed may entail stripping of the screw threads when an attempt is made to screw parts together. Such screw joints may lead to leaks.

In order to overcome these difficulties there has already been a proposal in the U.S. Pat. No. 4,033,615 to provide a female screw thread of the type initially mentioned which is to make possible connections with parts having NPT or BSP thread. This system does however leave to be desired, because the hybrid pitch angle provided along the full length and the averaged flank angle lead to substantial problems, more particularly when screwing into cylindrical Withworth or BSP threads. Such screw threads do not normally seal in the thread itself and in fact make necessary the use of additional gasket rings, which have to be swaged against an abutment surface. If however the threads jam when they have already been screwed together, it is not possible to ensure that there is optimum pressing of the gasket ring with the required degree of certainty.

SHORT SUMMARY OF THE PRESENT INVENTION

Accordingly one object of the invention is to provide a screw connection with screw threads of different types and more particularly with NPT, PT and taper and cylindrical BSP or Withworth threads so that in comparison with standard connections there are no disadvantages as regards manual operations and the sealing function and the requirements specified in the different countries as regards keeping to industrial standards, for instance in the course of inspection of components received from a supplier, are readily complied with.

In the case of a male screw thread of the type initially mentioned this object or other objects apparent herein are to be achieved since at the front axial end to be inserted the screw thread has a taper screw thread section becoming wider in a direction opposite to the direction of screwing in having a taper angle essentially equal to the NPT taper angle, following the taper section in the direction of screwing in there is a cylindrical thread section the cylindrical thread section is constituted by cylindrical BSP or Withworth thread corresponding to the respective rated thread size and having a number of threads per inch corresponding to the nominal value conventional for the nominal thread size, and the number of threads per inch of the taper thread section, including the limiting values, is between the nominal values of the cylindrical thread section and of the NPT thread with the same nominal size of thread.

The said object is however also to be attained in the case of a female thread of the type initially mentioned, which is characterized in that the cylindrical thread section is constituted by a cylindrical BSP thread or cylindrical Withworth pipe thread corresponding to the respective nominal thread size and having the conventional nominal value for the number of threads per inch for the nominal thread size and the taper thread section, which has a taper angle at least substantially corresponding to the NPT taper angle, has a number of threads per inch, which, including the limiting values, is in the range between the nominal values of the cylindrical thread section and the NPT thread with the same nominal thread size.

The nominal thread size is conventionally quoted in inches for such female threads, the most frequent nominal sizes being ⅛", ¼", ⅜", ½", ¾" and 1". The taper angle of the taper or conical section is preferably exactly equal to the NPT taper angle corresponding to a 1:16 taper of 1° 47' 24", this being the same as the taper angle of BSP and PT threads.

In the respective cylindrical thread section the conditions are therefore those corresponding to standard features of the respective nominal thread size so that a mating member with a complementary cylindrical thread may be screwedly connected and disconnected therewith without any trouble. It is only in the taper section that there is an adaptation of the number of threads per inch and hence the thread pitch by selecting a value here which is between the nominal number of threads per inch in the cylindrical section and the nominal number of threads per inch of an NPT thread with the same nominal thread size, including the limiting values. Thus if for instance ¼" is selected as nominal thread size so that in the cylindrical thread part there are 19 threads per inch, then in the taper section a number of threads per inch will be selected which is between this value of 19 and the conventional value of 18 threads per inch in the case of a ¼" NPT, the two limiting values of 18 and 19 also being possible. In this respect one will however approach or get as close as possible to the nominal value of the cylindrical thread section, the general rule applying that the smaller the quotient of the number of threads per inch between the cylindrical and the taper or conical thread section, the better the approach. The number of threads per inch in the taper thread section may be constant along the entire length or it may vary, more particularly continuously. If however there is a combination in which the number of threads per inch is identical in the cylindrical thread section and in an NPT, then this value will be kept unchanged and the range will decrease in size practically towards an identical initial and terminal values. This is for instance the case with ½" threads, in the case of which the number of threads per inch is 14 both in the case of cylindrical BSP or Withworth threads and also in the case of an NPT.

The invention will now be described in more detail with reference to the accompanying table (which is a comparison of the possible number of threads per inch for different nominal thread sizes) and the drawings, which relate to several working embodiments thereof.

LIST OF THE SEVERAL VIEWS OF THE FIGURES.

DETAILED ACCOUNT OF WORKING EMBODIMENTS OF THE INVENTION.

Figure 1:
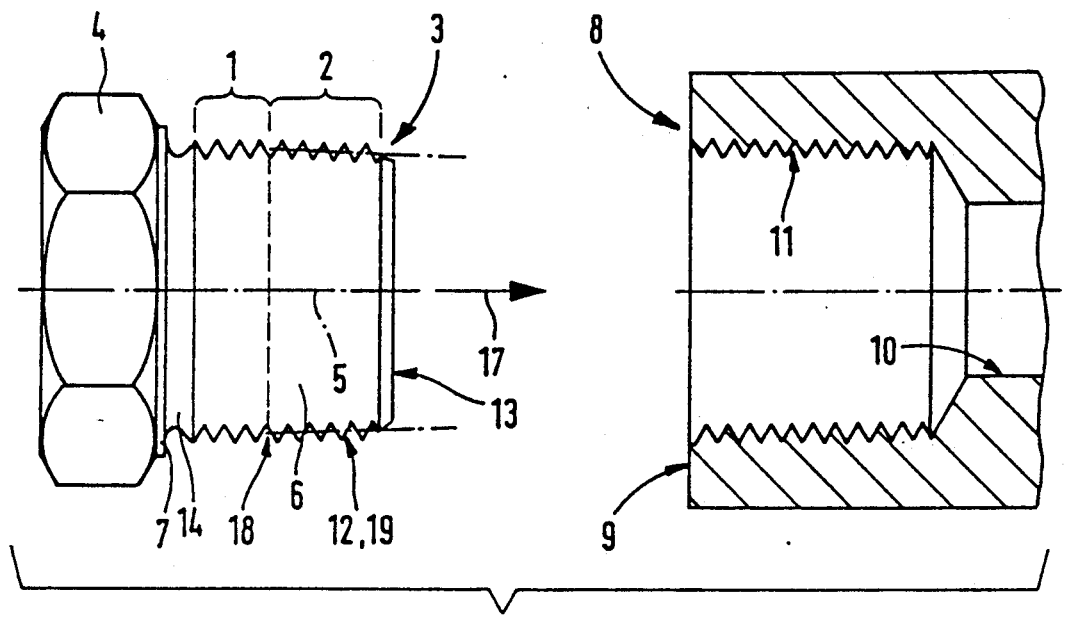
FIG. 1 shows a preferred working embodiment in the form of a male thread in accordance with the invention, showing one threaded member to be screwed into a mating member, partly in section.

FIG. 1 is a side elevation of a threaded member 3, which is in the form of a threaded plug or stopper and has a drive part 4 with a threaded part 6 adjoining it in the axial direction 5. A circumferentially annular extending collar 7 is formed on the axial side or end, which faces the part 6, of the drive part 4 and such collar 7 is separated from the threaded part 6 by an annular machined groove 14.

On the right hand side of FIG. 1 a mating member 8 is shown partly broken away, which is for instance constituted by the housing of a pneumatic valve. It possesses a fluid power duct 10 which opens at a connection side 9 whose end section facing the connection side 9 is provided with a female thread 11. The latter is in the form of a taper NPT, the angle of taper not being indicated; however it would be possible for it also to be a Japanese PT or a taper or cylindrical BSP or Withworth female thread.

Figure 2:
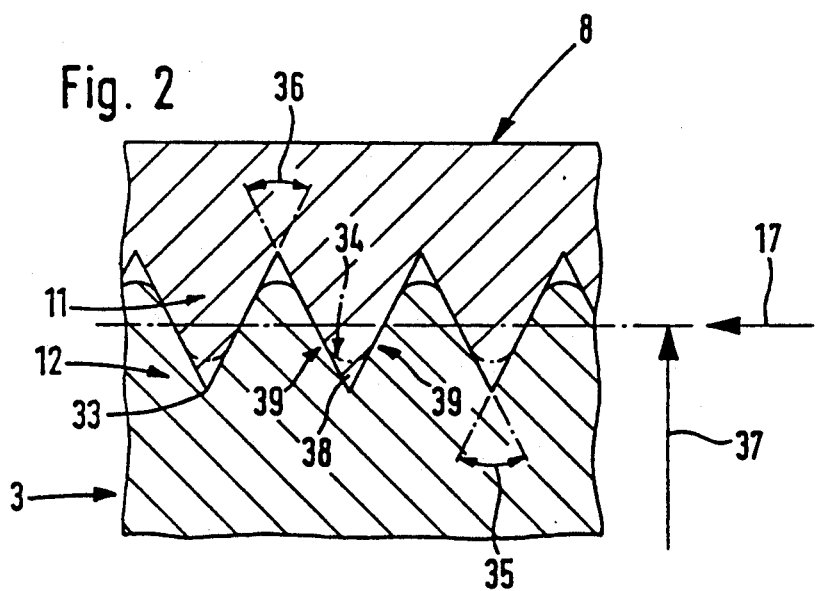
FIG. 2 shows on a larger scale of part thereof in the cylindrical thread section, the two parts having been screwed together.

In order to seal the fluid power duct in a pressure-tight manner, the threaded part 6 (of the threaded member 3) bearing a male thread 12, is able to be screwed into the female thread 11 of the connection bore of the fluid power duct 10. FIG. 2 shows a part on a larger scale in the screwed in condition and in longitudinal section.

In order for a pneumatic connection to be produced between the threaded member 3 and a fluid power duct or the like the member has an axially extending duct connected with the fluid power duct producing a communication with the fluid power duct 10 in the screwed in condition. The drive part 4 is adapted for the application thereto of a screwing tool in order to tighten the screw connection. It will be clear that the threaded member may, in accordance with the invention, have its place taken by any other desired member bearing a male thread, as for instance a piece of piping.

At its front end 13, that is to say the end which is to the front in the direction of insertion, the male thread 12 has a tapered thread section 2, which starting from the said front end 13 becomes wider in the direction opposite to the direction 17 of insertion or screwing in. This section is followed a cylindrical thread section 1, the diameters of the thread sections 2 and 1 on the two sides being at least substantially identical.

The male thread 12 is designed in accordance with a certain thread nominal size as is conventional in the pipe connection art, as for instance ¼" in the present working embodiment.

The taper angle of the tapered or conical thread section 2 is equal to the taper angle of a male NPT, in the case of which the taper has a slope of 1:16 or usually 1° 47' 24". The tapered form is exaggerated in the drawing for the sake of clarity. The taper thread section 2 is substantially on a frustum of a cone. By way of amplification attention is to be paid to the paragraph of the specification before the claims hereof and to the effect that references to the NPT taper angle are simultaneously always to be understood as references to the taper angle of BSP and PT structures, which are mutually identical so that it would also be possible to generally speak of the "taper angle of taper threads".

The present provides the feature that the cylindrical thread section 1 is constituted by a cylindrical BSP thread, whose structure corresponds to the structure of a conventional thread with a conventional thread nominal size, in the present case: ¼". It is also possible to have a male cylindrical Withworth pipe thread in accordance for instance with the ISO 228/1 pipe thread standard and which is substantially identical to a BSP thread with the same nominal thread size.

The number of threads per inch in the axial direction in the case of the cylindrical thread section 1 is in accordance with the associated thread nominal size, that is to say in the present case 19 threads per inch.

The number of threads per inch of the taper thread section 2 is in a range between the nominal value for the cylindrical thread section 1 and the nominal value for the NPT with the same nominal thread size. This range covers the basic or limit values.

Since the number of threads per inch for a ¼" NPT is 18 in the present case the number of threads per inch coming into question will be between 18 and 19 inclusive. In the working embodiment the number of threads per inch may therefore amount to 18.5 in the taper section.

In cases in which for a given nominal size of thread the number of threads per inch is identical for NPT specifications and the BSP or Withworth specifications—this being the case for instance for ½" threads—the range is reduced to the identical value provided for with the two threads so that in this case the entire male thread 12 has a constant pitch.

The accompanying table will provide an overview of the range of selection for the number of threads per inch in the taper thread section dependent on the nominal thread size while simultaneously indicating the nominal values for conventional cylindrical BSP or Withworth threads and NPT's.

If now the male thread 12 is screwed into the female thread 11, then in this case, since the latter thread is constituted by an NPT, the taper thread section 2 performs the main function of the joint. In order to ensure a sealing action a sealant composition or material is positioned between the two threads, preferably by the application of a coating on the male screw thread 12 in the necessary parts thereof.

If on the other hand in the case of the female thread it is a question of a cylindrical screw thread, then the main load bearing part will be on the cylindrical screw thread 1, which may be readily screwed in, the annular collar 7 or an intermediately placed gasket ring being pressed against the connection side 9.

The male screw thread 12 hence constitutes a universal thread 19, which renders possible universal screw assembly with a multiplicity of other types of threads.

Figure 3:
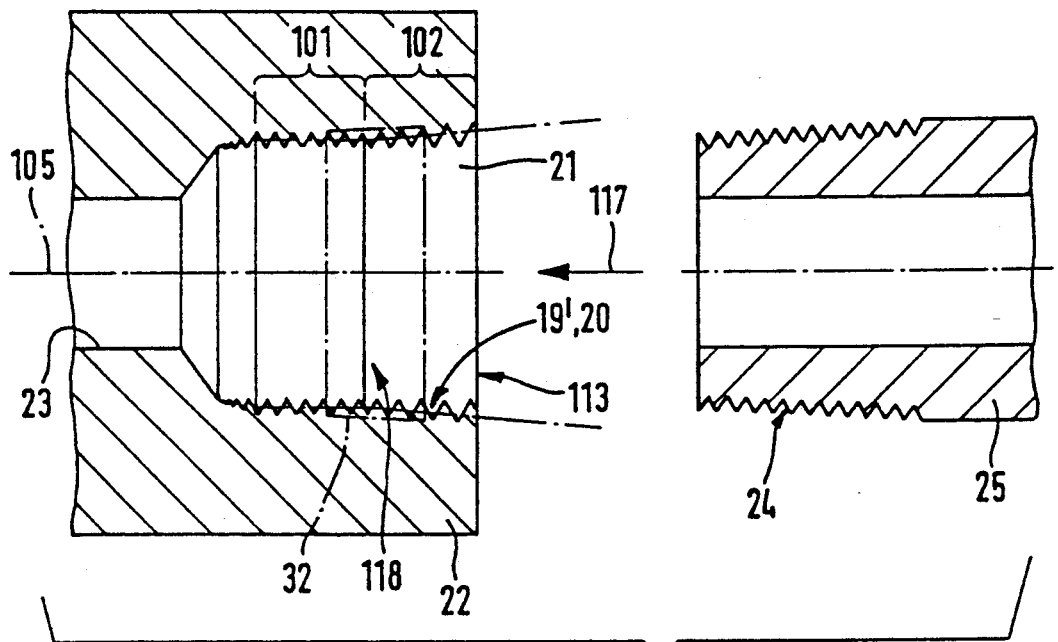
FIG. 3 shows a female thread in the case same manner of representation as in FIG. 1.

In the illustrated working embodiment of FIG. 3 as well a universal screw thread 19' is provided, which in this case however is constituted by a female thread 20, which is incorporated in fluid power port 21 of a piece of pneumatic equipment 22, which is in communication with a fluid power duct 23 extending in the equipment 22. Obeying the same principles as the male thread 12 of FIG. 1 this female screw thread 20 is so designed that it may cooperate with different male threads 24, which are provided on male members 25, of which FIG. 3 shows for instance in the right hand half one in longitudinal section in part. In this respect it is a question of a tubular connector with an internal fluid power duct, the specific design however being quite free.

Apart from the fact that the universal screw thread 19 in FIG. 1 is constituted by a male thread and the universal screw thread 19' of FIG. 3 is in the form of a female thread, and furthermore apart from some further differences noted in what follows, the basic structure of the two universal screw threads 19 and 19' is identical. For this reason there is no need to provide a new detailed account and only the details and components which are identical are referenced with numerals increased by 100 and in other respects attention is to be had to the account with reference to FIG. 1, which also applies for FIGS. 3 and 4.

There is however the departure from the working embodiment in accordance with FIG. 1 that the taper thread section 102, which is at the front end 113, becomes narrower in the direction 117 of insertion of the male member 25, that is to say in the axial direction extending into the interior of the port opening 21, this then being adjoined by the cylindrical thread section 101. The enclosed table also applies for the working embodiment illustrated in FIG. 3. In the merging zone 118 between the two screw thread section 101 and 102 the thread diameter of the two sections is the same.

In the case of the two universal screw threads 19 and 19' given by way of example the number of threads per inch in the thread section 2 and 102 is constant along the entire threaded length of this section. This more particularly facilitates production. Preferably the constant value selected is one near the nominal value for the cylindrical section 1 and 102.

In accordance with the respective circumstances it may be appropriate for the designer to vary the number of threads per inch in the taper thread section 2 and 102 at least along part of the length of this screw threaded section 2 and 102. In this case it is preferable in the merging zone 18 and 118 to set a value which corresponds to the cylindrical thread section 1 and 102 or is at least a good approximation thereof, starting from which the number of threads per inch approaches, towards the front end 13 and 113 (more particularly continuously) the value for the NPT in order to possibly to become equal to it. Using a computerized machine tool the production of such screw threads is no longer a problem. Since the pitch of a thread expressed in inches corresponds to the reciprocal of the number of threads per inch, the above remarks naturally also apply if the "number of threads per inch" is replaced by the pitch.

In certain circumstances it may be convenient to modify the taper screw thread section 102 of the female thread 20 in order to ensure that go no-go gages used for quality control operate satisfactorily. A preferred modification in this respect is illustrated in FIG. 3 in broken lines. In this respect the axial end part, adjacent to the cylindrical screw thread section 101, of the taper screw thread section 102 is still constituted by a taper or conical merging screw thread section 32, which has a taper angle less than the taper angle of the remaining unaltered part of the taper screw thread section 102. In this respect the merging zone 118 will undergo an axial displacement regularly in the insertion direction 117. The merging screw thread section in this case serves to prevent, inter alia, a go no-go gage provided for the respective thread nominal size being screwed too far into the member. The direction of taper is the same on both tapers 102 and 32.

In this case therefore the universal thread 19' designed in the form of a female thread substantially consists of three axially consecutive thread sections, the merging thread section 32 only constituting the terminal section of the taper thread section 102 so that the above observations on the rest of the design still apply in full.

In FIG. 2 the reader will see the engagement between the female thread 11 in the form of an NPT of the mating member 8 and the cylindrical thread section 1 of the male thread 12 in longitudinal section. In this respect the reader will see that the thread crest 33, that is to say the top zone of the NPT female thread 11 may theoretically intersect with the thread root 34 of the cylindrical thread section 1. This is due to the different types of thread and more particularly to the different flank angles, since the nominal value of the flank angle 36 of the NPT is equal to 60° and the nominal value 35 of the BSP or Withworth thread is equal to 55°. Since the intersection is however very small and in the case of many types of thread is more or less insignificant, deformation will normally entail an automatic compensation or physical adaptation.

More particularly when this is not the case it is however preferable to take measures even during the production of the universal thread 19 which ensure that the zone with the root 34 of the thread is physically adapted to the thread crest zone of an NPT 11 with the same nominal size. In this respect an adaptation will be called for more particularly in that part of the universal thread 19, which is radially outside the flank diameter 37 shown in broken lines.

One measure for adaptation is possible in which the thread root zone 34 is made radially deeper than in the case with standard diameters, preferably in such a manner that the diameter at the root of the thread is approximately equal to the diameter at the crest 33 of the associated NPT. The zone which has been made deeper is illustrated in FIG. 2 at 38 and here in cross section it is made generally triangular, although in certain cases it may depart from such form.

At the crest of the male thread 12 an adaptation is not necessary, since the diameter of the thread in this part is less than the diameter at the foot of the NPT 11.

As a further measure for adaptation the thread flanks adjacent to the root 34 of the thread may be designed with an adaptation to the flanks of the female NPT 11. This zone is illustrated at 39 and in the case of the adaptation of the flank angles of the cylindrical thread section 1 here there is an approximation or even an adaptation to that of the associated NPT female thread for instance. The modified flank angle may the preferably assume values between 55° and 60° inclusive, the adapted zone 39 preferably being between the flank diameter 37 and the thread root 34. In an extreme case it is therefore possible for the cylindrical thread section 1 to be shaped to be outside the flank diameter 37 in a conventional standard manner, while the zone within the flank diameter is shaped to be at least approximately in agreement with an NPT.

The respective adaptations are preferably also produced respectively in the taper section 2 in order to simplify manufacture.

Figure 4:
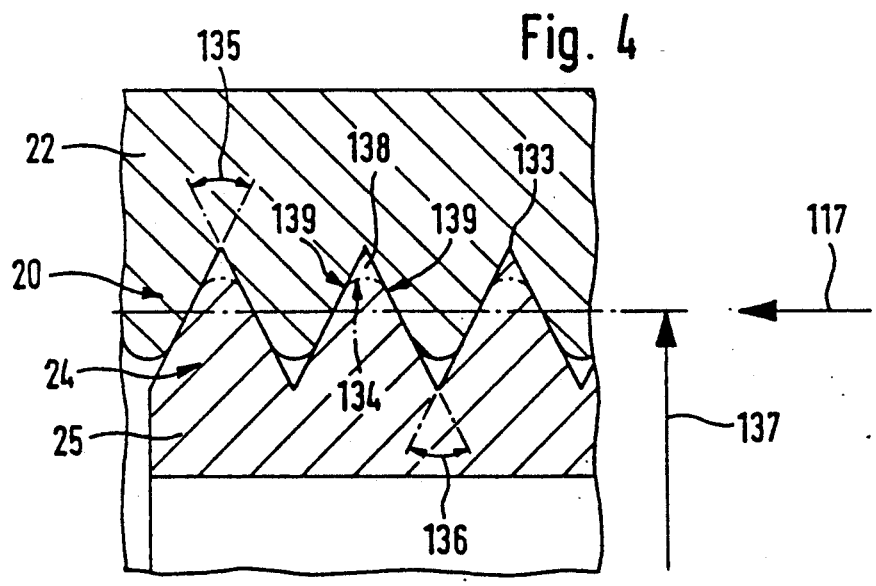
FIG. 4 shows part of the structure as in FIG. 3 with the two parts screwed together as in FIG. 2.

For the universal thread 19' designed in the form of a female thread the same considerations apply. In FIG. 4, which shows the screwed together condition of the threads 20 and 24 of FIG. 3 in the same manner as in FIG. 2, the comparable or similar details and components are referenced with numerals increased by one 100 above the references used in FIG. 2. The above explanations with reference to FIG. 2 apply correspondingly, but however with the reservation that here the deeper part 138 and the adapted zone 139 are positioned radially outside the flank diameter 137.

It will be clear that in certain circumstances the two female and male threads 20 and 12, which are designed as universal threads 19 and 19', may be able to be screwed together.

The absolute length of the respective thread sections 1, 101, 2, and 102 is selected in accordance with requirements, different length ratios being appropriate in the case of the different nominal thread sizes. The ratio of the lengths of the thread sections may for instance in the case of universal male thread 19 between the taper section 2 and the cylindrical section 1 be 45:55 for ⅛", 1:1 for ¼" and 3:2 for respectively ⅜",½",¾" and 1".

The references to the NPT taper angle are simultaneously always to be understood as references to the taper angle of BSP and PT structures, which are mutually identical so that it would also be possible to generally speak of the "taper angle of taper threads".

| Thread Size In Inches | Numbers of Threads Per Inch For Cylindrical BSP (= Withworth Pipe Thread, Cylindrical, f. i. ISO 228/1) [Reference Numberals 1, 101] | Number of Threads Per Inch National Pipe Thread | Range of Selection of Number of Threads Per Inch In Taper Thread Section (Including Limit Values) [Reference Numberals 2, 102] |
| --- | --- | --- | --- |
| ⅛ | 28 | 27 | 27–28 |
| ¼ | 19 | 18 | 18–19 |
| ⅜ | 19 | 18 | 18–19 |
| ½ | 14 | 14 | 14 |
| ¾ | 14 | 14 | 14 |
| 1 | 11 | 11,5 | 11–11,5 |

I claim:

1. A male thread for a screw member for screwing into a female thread of a mating member, comprising a taper thread section widening in a direction opposite to the direction of axial insertion, said taper thread section having a taper angle at least essentially equal to a NPT taper angle, and a cylindrical thread section which adjoins the taper thread section in a direction opposite to the direction of insertion, the cylindrical thread section having a thread corresponding to the respective nominal thread size, the thread of the cylindrical thread section having a number of threads per inch corresponding to the conventional nominal value of the nominal thread size, and wherein the number of threads per inch of the taper thread section including the limiting values of the range is between the nominal values of the cylindrical thread section and of the NPT with the same nominal thread size.

2. The male thread as claimed in claim 1, wherein the number of threads per inch of the taper thread section has a value which is constant along the entire threaded length of this section.

3. The male thread as claimed in claim 2, wherein the constant value is near the nominal value for the cylindrical thread section.

4. The male thread as claimed in claim 3, wherein the constant value is equal to the nominal value.

5. The male thread as claimed in claim 1, wherein the number of threads per inch of the taper thread section varies at least along part of the length of the section.

6. The male thread as claimed in claim 5, wherein the number of the threads per inch of the taper thread section varies along the entire length of the section.

7. The male thread as claimed in claim 5, wherein commencing with the zone adjacent to the cylindrical thread section and extending towards the front end, the number of threads per inch, starting at the nominal value of the cylindrical thread section, incrementally approaches towards the nominal value of the NPT.

8. The male thread as claimed in claim 7, wherein the approach is a continuous one.

9. The male thread as claimed in claim 1, wherein the thread root zone in the cylindrical thread section is adapted in its configuration to the zone of the thread crest of a female NPT with the same nominal thread size.

10. The male thread as claimed in claim 9, wherein the thread root zone is made radially deeper than the nominal dimensions so that the diameter of the thread at the root of the thread is at least approximately equal to the thread diameter at the thread crest of the respective female NPT.

11. The male thread as claimed in claim 9, wherein the adaptations are made accordingly in the zone with the taper thread section.

12. The male thread as claimed in claim 9, wherein at the thread root its flank angle is adapted to that of the corresponding female NPT.

13. The male thread as claimed in claim 12, wherein the adapted flank angle is between 55° and 60°.

14. The male thread as claimed in claim 1, wherein it is at least partly coated with a sealant.

15. The male thread as claimed in claim 1, wherein the female thread of the mating member is selected from the group consisting of cylindrical Withworth pipe thread, taper Withworth pipe thread, BSP thread, PT and NPT.

16. The male thread as claimed in claim 1, wherein the thread of the cylindrical thread section is selected from the group consisting of cylindrical BSP thread and cylindrical Withworth pipe thread.

17. A female thread adapted to screwingly receive a male thread provided on a male member comprising a front axial end having a taper thread section becoming narrower in the direction of screwing insertion, and a cylindrical thread section axially adjoining said taper thread section in the direction of screwing insertion, said cylindrical thread section having a thread corresponding to the respective thread nominal size, said thread having a number of threads per inch corresponding to the conventional nominal value of the thread nominal size, and the taper thread section having a taper angle at least substantially corresponding to the NPT taper angle and having a number of threads per inch in the range between the nominal values of the cylindrical thread section and of an NPT having the same thread nominal size including the limiting values of the range.

18. The female thread as claimed in claim 17, wherein the number of threads per inch of the taper thread section has a constant value along the entire length of this section.

19. The female thread as claimed in claim 18, wherein the constant value is in the region of the nominal value for the cylindrical thread section.

20. The female thread as claimed in claim 19, wherein the constant value is equal to the nominal value.

21. The female thread as claimed in claim 17, wherein the number of threads per inch in the taper thread section varies at least along part of the length.

22. The female thread as claimed in the claim 21, wherein the number of threads per inch in the taper thread section varies along the entire length of the section.

23. The female thread as claimed in claim 21, wherein starting from the zone adjacent to the cylindrical thread section the number of threads per inch in the taper thread section tends, in the direction opposite to the screwing insertion and starting at the nominal value of the cylindrical thread section, towards the nominal value for the NPT.

24. The female thread as claimed in claim 17, wherein the thread root zone is geometrically adapted, at least in the cylindrical thread section, to the crest zone of a male NPT with the same thread nominal size.

25. The female thread as claimed in claim 24, wherein the adaptations are made accordingly in the part with the taper thread section.

26. The female thread as claimed in claim 24, wherein at the thread root the flank angle of the female thread is adapted to that of the associated male NPT.

27. The female thread as claimed in claim 26, wherein the adapted flank angle is between 55 and 60°.

28. The female thread as claimed in claim 17, wherein the thread root zone is made radially deeper than the nominal dimensions so that the thread diameter at the thread root is at least approximately equal to the thread diameter at the thread crest of the associated male NPT.

29. The female thread as claimed in claim 17, wherein it is at least partly coated with a sealant.

30. The female thread as claimed in claim 17, wherein the axial end part adjacent to the cylindrical thread section, of the taper thread section is constituted by a merging thread section whose taper angle is reduced to be less than the taper angle of the remaining part at the front end of the taper thread section.

31. The female thread as claimed in claim 17, wherein the thread of the cylindrical thread section is selected from the group consising of cylindrical BSP thread and cylindrical Withworth pipe thread.

32. The female thread as claimed in claim 17, wherein the male thread on the male member is selected from the group consisting of cylindrical Withworth pipe thread, taper Withworth pipe thread, BSP thread, PT and NPT.

* * * * *

UNITED STATES PATENT AND TRADEMARK OFFICE
CERTIFICATE OF CORRECTION

PATENT NO. : 5,221,113
DATED : June 22, 1993
INVENTOR(S) : Stoll

It is certified that error appears in the above-identified patent and that said Letters Patent is hereby corrected as shown below:

Column 7, Line 62, "respectively 3/8", 1'2", 1/8" and 1"." should be --respectively 3/8", 1'2", 3/4" and 1".--;

Column 8, Line 8, "In [Reference Numberals" should be --In [Reference Numerals--;

Column 8, Line 8, "Pipe [Reference Numberals" should be --Pipe [Reference Numerals--.

Signed and Sealed this

Fifteenth Day of February, 1994

Attest:

BRUCE LEHMAN

Attesting Officer

Commissioner of Patents and Trademarks